United States Patent [19]

Baumbach

[11] Patent Number: 4,502,088

[45] **Date of Patent: * Feb. 26, 1985**

[54] LINE PROTECTOR FOR A COMMUNICATIONS CIRCUIT

[75] Inventor: Bertram W. Baumbach, Arlington Heights, Ill.

[73] Assignee: Reliance Electric Company, Cleveland, Ohio

[ * ] Notice: The portion of the term of this patent subsequent to Dec. 20, 2000 has been disclaimed.

[21] Appl. No.: 476,703

[22] Filed: Mar. 18, 1983

[51] Int. Cl.³ .............................................. H02H 9/06

[52] U.S. Cl. .................................. 361/124; 361/119; 337/32

[58] Field of Search ............................. 361/119, 124; 337/31–34, 18, 28

[56] References Cited

U.S. PATENT DOCUMENTS 4,168,515 9/1979 Baumbach .......................... 361/124
4,307,430 12/1981 Montalto et al. .................. 361/125
4,335,416 6/1982 Hollfelder et al. ............ 361/124 X
4,422,121 12/1983 Baumbach ...................... 361/124 X

*Primary Examiner*—Patrick R. Salce
*Attorney, Agent, or Firm*—Trexler, Bushnell & Wolters, Ltd.

[57] ABSTRACT

A line protector for a communications circuit provides overvoltage and overcurrent protection. The overvoltage protection is attained through an arrester that provides an arc gap from the line to ground. For overcurrent protection, a fusible element is melted by a heat coil causing the line to be directly grounded. A test terminal is in conductive connection with the line circuit and extends to a region in the housing wall wherein there is an aperture for receiving a test probe. The test terminal is in firm resilient engagement with a conductive component of the line circuit and the wall adjacent to the apertures whereby the test terminal is maintained in its desired position within the housing to avoid short circuits therein.

3 Claims, 4 Drawing Figures

LINE PROTECTOR FOR A COMMUNICATIONS CIRCUIT

BACKGROUND OF THE INVENTION

This invention relates to improvements in communications line protectors, and more particularly to line protectors of the type that are located between central office switching equipment and inside switching-related equipment. The purpose of these line protectors is to protect the inside equipment from damage as a result of overvoltage and overcurrent conditions on the outside lines. One such line protector is shown in U.S. Pat. No. 4,168,515 issued Sept. 18, 1979, and the present invention is an improvement that is specifically directed to that line protector.

In telephone central offices where these protectors are located, they are typically mounted on a protector panel or connector board and with the protector devices being inserted into contacts on the board. The connector board is generally located at the juncture between outside plant lines and the central office equipment. Each protector unit generally serves the purpose of protecting both the tip side and the ring side of each line pair which are terminated on the connector panel. Generally speaking, the panel incorporates a test field so that electrical tests may be made on outside facilities or inside equipment in a convenient manner. Where a test field is not used or embodied on the connector panel, access for testing of the telephone pairs for each module may be conveniently accomplished by access holes in the module housing so that probes may be inserted into the housing for contact with the tip and ring circuits therein. One such arrangement is shown in U.S. Pat. No. 4,307,430 that issued Dec. 22, 1981. Rather than incorporating the features of U.S. Pat. No. 4,307,430, the present invention involves the novel modification of an existing commercial form of line protector as shown in U.S. Pat. No. 4,168,515, referred to above.

SUMMARY OF THE INVENTION

An object of this invention is to provide a line protector of the central office type having facilities for line testing through test terminals within the module and to which access may be had by test probes through apertures in the wall of the module housing.

A more specific object of this invention is to provide a line protector of the type stated in which the test terminal is resilient and is bent within its elastic limits to maintain its position within the module and also to provide intimate contact with its associated line circuit in the module.

Broadly speaking, the invention comprises a line protector for a communications circuit comprising a housing having an end wall and an opening opposite to said end wall, an insulating member forming a base closing said opening, conductive line pins and a ground pin projecting from said base, a first conductive element secured to one of said line pins and a second conductive element secured to the other line pin, each conductive element and its associated pin being electrically insulated from the other conductive element and its associated pin, a heat coil assembly having portions secured together by a fusible substance, a coil of wire having one end connected to one conductive element and the other end of the coil connected to the other conductive element, thereby to form a protector circuit between the line pins and wherein the coil generates heat to melt the fusible substance upon an overcurrent condition in a communications line circuit in which the protector circuit is a part, a surge voltage arrester in a normally open circuit from said line circuit to said ground pin, a conductive test terminal in said housing, said test terminal extending between said end wall and one of said conductive elements, said test terminal being resilient and having a normal length that is greater than the distance between said end wall and said one conductive element so that said test terminal is bent within its elastic limits to maintain intimate contact at one end with said one conductive element and at its other end with said end wall, and said end wall having an aperture at which said test terminal is exposed for receiving a test probe to test said line circuit, and means including the resiliency of said test terminal and cooperating portions of said housing and said terminal to aid in maintaining said test terminal in a fixed position in said housing.

DETAILED DESCRIPTION OF THE ILLUSTRATED EMBODIMENT

Figure 1:
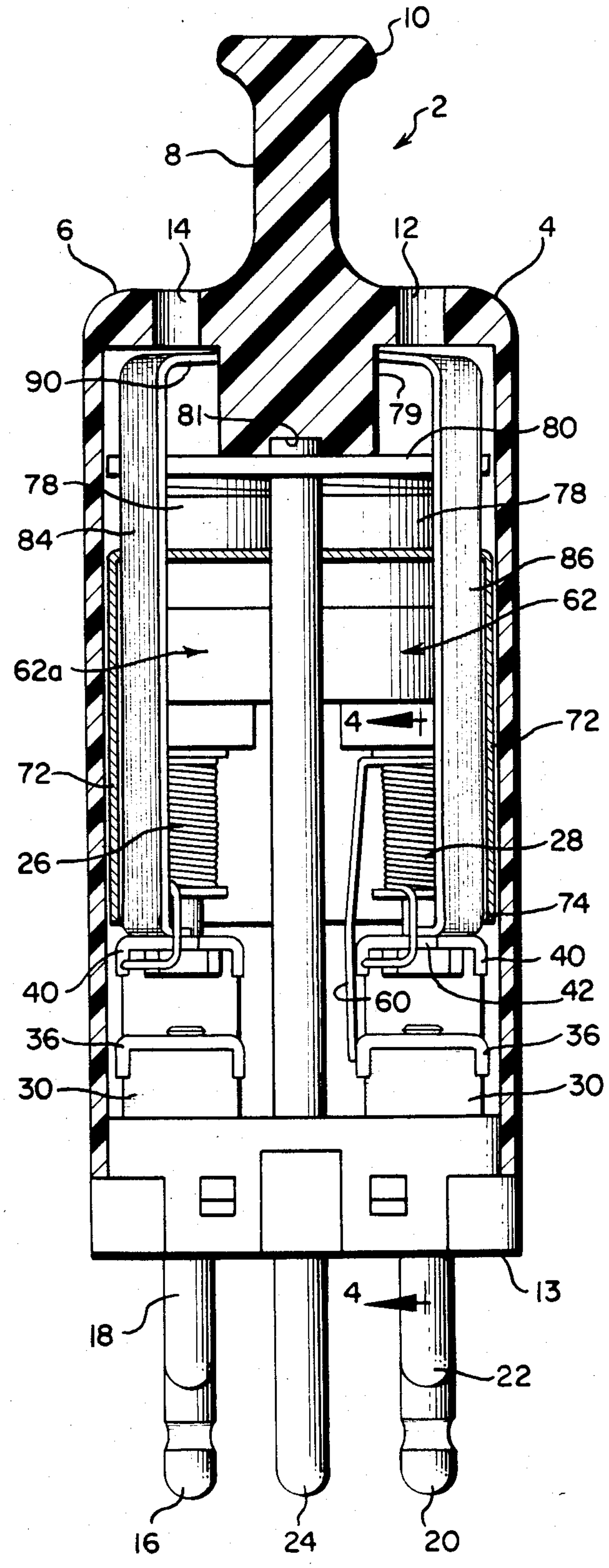
FIG. 1 is a front elevational view, partially in section.
Figure 2:
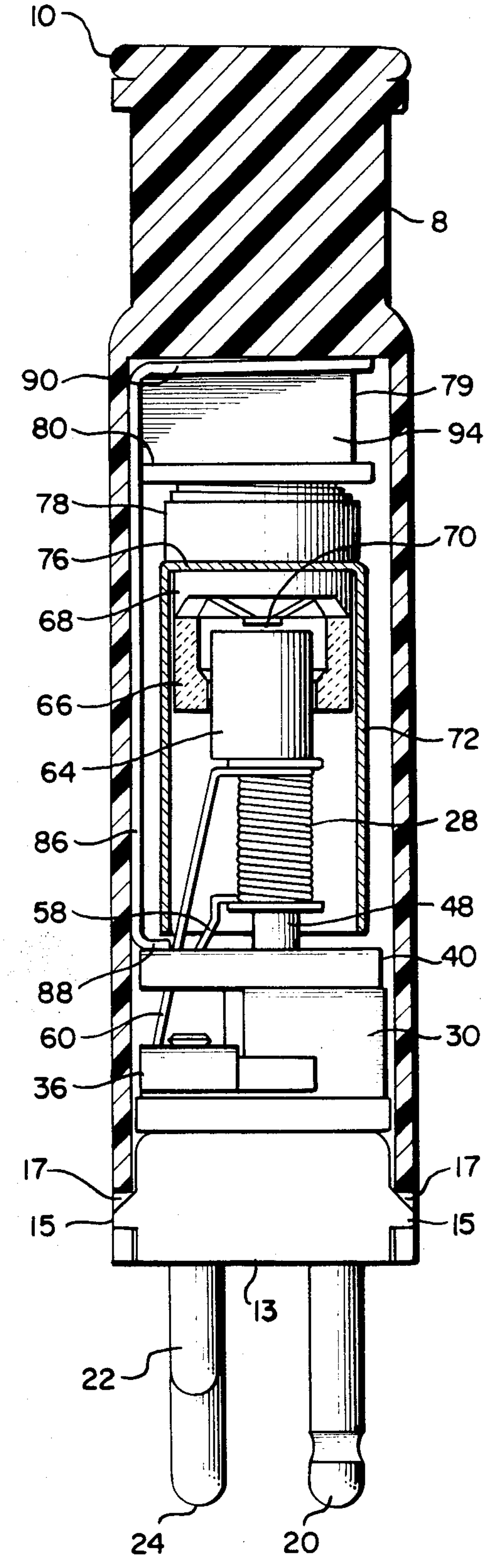
FIG. 2 is a side elevational view, partially in section.
Figure 3:
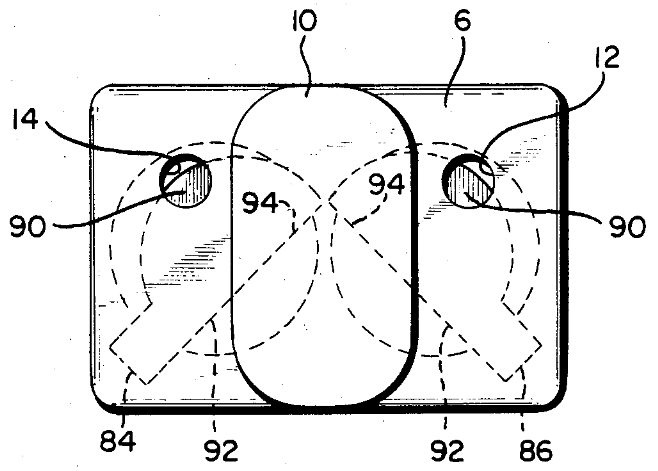
FIG. 3 is a top plan view of the module of FIGS. 1 and 2.
Figure 4:
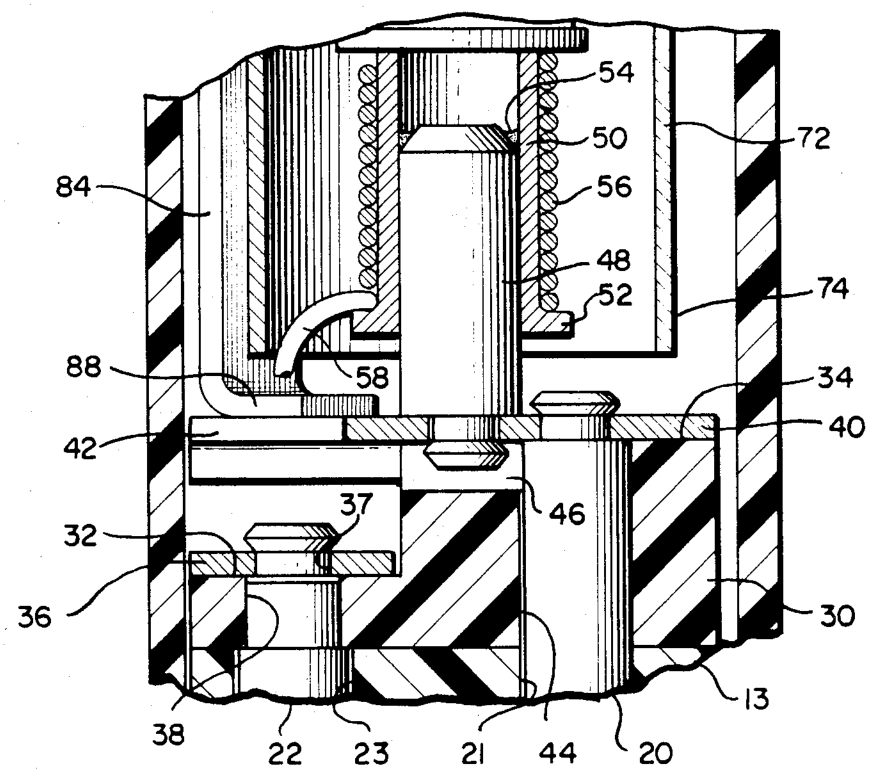
FIG. 4 is an enlarged fragmentary sectional view taken along line 4—4 of FIG. 1.

Referring now in more detail to the drawing, there is shown a protector 2 having a generally rectilinear insulating plastic housing 4. One end of the housing 4 has an end wall 6 which merges into a neck 8 and a flange 10 by which the protector may be gripped for removal from and placement into a plug-in type of terminal board having wired connections to the incoming outside lines and also to the inside or central office equipment. The end wall 6 has a pair of perforations or apertures 12, 14 for test probe access as will presently be more fully described. At its end opposite to the wall 6 the housing is open, and this opening is closed off by a plastic base 13 containing laterally projecting locking tabs 15. These tabs 15 interlock with a snap fit into openings 17 adjacent to the resilient open end of the housing.

Projecting through the base 13 are conductive plug-in terminal pins 16, 18, 20, 22 and 24. More specifically, there is a first line pin 16, a shorter first central office pin 18, a second line pin 20, a shorter second central office pin 22, and a ground pin 24. The line pin 16 and central office pin 18 are in one of the incoming line pairs (tip or ring) through the protector while the second line pin 20 and its associated central office pin 22 are in the other line circuit through the protector. The ground pin 24 is suitably connected through the plug-in receptacle to ground in a conventional manner.

In the line circuit between the pins 16, 18 there is a heat coil circuit 26, and likewise in the line circuit of the pins 20, 22 there is a heat coil circuit 28. These heat coil circuits are of similar construction, and therefore, only one circuit need be described with like reference numerals being applied to both heat coil circuits 26, 28. Each heat coil circuit is characterized by the fact that there are permanent connections from one line pin to the other line pin. For example, there is a permanent connection between line pins 16 and 18 and through heat coil circuit 26. These connections are preferably brought about by staking the line pin to respective contact plates (hereinafter described) and by welding the ends of the heat coil wire to the respective contact plates.

A sub-base 30 of insulating plastic is of generally rectilinear configuration but includes a lower step or surface 32 and an upper step or surface 34. The lower step 32 receives a metallic contact plate 36 which is of generally U-shaped cross section as seen in FIG. 1. The plate 36 has a hole 37 for receiving the upper end of the pin 22 which is upset or staked into rigid and permanent mechanical and electrical contact with the plate 36. The hole 37 and the plate 36 is aligned with a hole 38 in the sub-base 30 for receiving a section of the pin 22.

A second contact plate 40, also of U-shaped cross section, is mounted on the upper step 34. The plate 40 overhangs or projects beyond the uppe step 34 so as to lie spaced above the plate 36. The overhang part of the plate 40 has a slot 42 for purposes presently more fully appearing. The upper end of the line pin 20 projects through the plate 40 and is upset or staked in place to provide a rigid and permanent mechanical and electrical connection therewith. The line pin 20 also projects through a hole 44 in the sub-base 30 such that the two pins 20, 22 are in parallel relationship. The pins 20, 22 also freely pass through holes 21, 23 in the base 10.

The upper step 34 has an upwardly and laterally opening cavity 46 for accommodating the reduced diameter lower end of a heat coil pin 48. This cavity 46 may extend into or merge with the hole 44. The heat coil pin 48 projects perpendicularly from the plate 40, and the heat coil pin telescopes within a tubular metallic member constituting a heat coil bobbin 50 having a flanged end 52. The heat coil pin 48 and its bobbin 50 are normally maintained in a rigid assembled relationship by low melting point solder 54 between the pin and the bobbin. The heat coil wire 56 is wound around the exterior of the bobbin 50 and is retained by the end flange 52. One of the leads 58, 60 from the heat coil passes through the slot 42 and those leads are rigidly joined in mechanical and electrical connection to the respective plates 36, 40.

Also mounted within the housing 4 and associated with the line circuit running from the pin 16 to the pin 18 is an overvoltage arrester unit 62 of known construction. A like arrester unit 62*a* is associated with the line circuit running from the pin 20 to the pin 22. The arrester may be a carbon air gap arrester or a cold cathode gas tube. In the embodiment of the invention illustrated, there is a carbon air gap arrester. This arrester comprises a carbon rod electrode 64, the lower end of which abuts the upper end of the heat coil bobbin 50, thus providing an electrical connection to the associated line circuit. The arrester unit 62 also includes a ceramic insulator 66 to which the carbon rod 64 is bonded. Cooperating with the carbon rod electrode is a carbon disc electrode 68 of known construction and which seats against the upper end face of the insulator 66. The end of the carbon rod that faces the disc 68 is recessed into the insulator so as to define an arc gap 70.

Each overvoltage arrester unit is housed within an inverted metallic cup 72 which also receives the associated heat coil bobbin 50. The lower open end 74 of the cup 72 is spaced from the plate 40 a distance which is less than the distance from the upper end of the bobbin pin 48 to the lower end of the carbon rod 64.

Interposed between the end wall 76 of the cup 72 is a volute spring 78. This volute spring 78 applies pressure to the cup 72 which in turn presses the carbon rod electrode against the bobbin 50. However, the bobbin stays fixed relative to the pin 48 so long as the fusible solder material 54 remains solid.

The upper end of the volute spring 78 presses against a grounding plate 80 which is positioned against a boss 79 that projects inwardly from the end wall 6 of the housing. The grounding plate 80 is of such extent that it contacts both volute springs 78, 78 in the module. This grounding plate is metallic and is staked or otherwise rigidly secured to the ground pin 24. The ground pin 24 runs downwardly between the assemblies in each half of the housing so as to project through the base 10. The extreme end of the ground pin 24 projects into a small cavity 81 in the boss 79.

In a transient overvoltage condition on one of the lines, for example the line in which the pins 16, 18 are located, this transient voltage will be applied through plate 40, heat coil pin 48 and bobbin 50 to the carbon electrode 64. This voltage will result in an arc across the arc gap 70, through the cup 72, the volute spring 78 and ground plate 80 to the ground pin 24. Generally speaking, the unit is self-restoring under such conditions.

In an overcurrent condition on the same line circuit, the heat coil 56 will generate sufficient heat to melt the solder 54. Pressure from the volute spring transmitted to the carbon rod 64 will press against the bobbin 50 causing it to slide downwardly along the pin 48. The action of the spring will move the metallic cup 72 until its end 74 engages the plate 40 to ground the line through the ground pin 22.

Also within the housing are test terminals 84, 86 which are formed of sheet metal and which extend generally longitudinally of the housing 4. Each test terminal 84, 86 has a small end flange 88 that fits flush against the surface of the plate 40. At its end adjacent to the housing wall 6, each test terminal has a large flange 90 which is roughly semi-circular in shape and which lies in close proximity to the associated housing aperture 12 or 14, as the case may be. Each top flange 90 has a generally straight edge 92 which fits flush against a relatively flat surface portion 94 on the boss 79, thereby assisting and orienting the test terminals within the housing and aiding in keeping the test terminals in their desired positions. As a result of the close proximity of the flanges 90 with the apertures 12, 14, a test probe may be readily inserted through the apertures 12, 14 for contact with the test terminals to test the condition of the lines.

The normal or nominal length of each test terminal between its flanges 88, 90 is preferably greater than the distance between the inside surface of the wall 6 and the associated plate 40. Each test terminal is resilient so that the test terminal is bent within its elastic limits resulting in its length being foreshortened somewhat but with this resiliency or elasticity of the test terminal being utilized to maintain it in intimate contact with both the wall 6 and the plate 40. Consequently, the test terminals are held in their desired positions remote from other live parts in the module and preferably such that the parts of the test terminals between the flanges 88, 90 are near the corners of the module housing.

I claim:

1. A line protector for a communications circuit comprising a housing having an end wall and an opening opposite to said end wall, an insulating member forming a base and having step surfaces, said base closing said opening, conductive line pins projecting from said base, a first conductive element rigidly secured to one of said line pins and a second conductive element rigidly secured to the other line pin, said conductive elements being respectively supported by the step surfaces and each conductive element and its associated pin being electrically insulated from the other conductive element and its associated pin, a heat coil assembly having telescoping portions rigidly secured together by a fusible substance, a coil of wire surrounding said telescoping portions and having one end of the coil connected to one conductive element and the other end of the coil connected to the other conductive element, thereby to form a protector circuit between the line pins and wherein the coil generates heat to melt the fusible substance upon an overcurrent condition in a communications line circuit in which the protector circuit is a part, one of said telescoping portions being rigidly secured to one of said conductive elements, the conductive elements being between the heat coil and the insulating member, a conductive test terminal in said housing, said test terminal extending between said end wall and one of said conductive elements, said test terminal being resilient and having a normal length that is greater than the distance between said end wall and said one conductive element so that said test terminal is bent within its elastic limits to a condition foreshortened from its normal length to maintain intimate pressure contact with said one conductive element and with said end wall, and said end wall having an aperture at which said test terminal is exposed for receiving a test probe to test said line circuit.

2. A line protector according to claim 1 in which said end wall has an inwardly projecting boss having a surface that abuts an edge on said test terminal to aid in orienting said test terminal in said housing, said housing interior having a generally rectangular cross-section and said test terminal, between said end wall and said conductive element, running substantially along a corner of the housing.

3. A line protector for a communications circuit comprising a housing having an end wall and an opening opposite to said end wall, an insulating member forming a base closing said opening, conductive line pins and a ground pin projecting from said base, a first conductive element secured to one of said line pins and a second conductive element secured to the other line pin, each conductive element and its associated pin being electrically insulated from the other conductive element and its associated pin, a heat coil assembly having portions secured together by a fusible substance, a coil of wire having one end connected to one conductive element and the other end of the coil connected to the other conductive element, thereby to form a protector circuit between the line pins and wherein the coil generates heat to melt the fusible substance upon an overcurrent condition in a communications line circuit in which the protector circuit is a part, a surge voltage arrester in a normally open circuit from said line circuit to said ground pin, a conductive test terminal in said housing, said test terminal extending between said end wall and one of said conductive elements, said test terminal being resilient and having a normal length that is greater than the distance between said end wall and said one conductive element so that said test terminal is bent within its elastic limits to a condition foreshortened from its normal length to maintain intimate pressure contact at one end with said one conductive element and at its other end with said end wall, and said end wall having an aperture at which said test terminal is exposed for receiving a test probe to test said line circuit, and means including the resiliency of said test terminal and cooperating portions of said housing and said terminal to aid in maintaining said test terminal in a fixed position in said housing.

* * * * *